(12) United States Patent
Jang

(10) Patent No.: US 7,450,511 B2
(45) Date of Patent: Nov. 11, 2008

(54) METHOD AND SYSTEM FOR POLLING PDU OF RADIO LINK CONTROL LAYER

(75) Inventor: Sung-Kyung Jang, Gyunggi-Do (KR)

(73) Assignee: LG Electronics Inc., Seoul (KR)

( * ) Notice: Subject to any disclaimer, the term of this patent is extended or adjusted under 35 U.S.C. 154(b) by 858 days.

(21) Appl. No.: 10/409,445

(22) Filed: Apr. 9, 2003

(65) Prior Publication Data

US 2003/0202501 A1 Oct. 30, 2003

(30) Foreign Application Priority Data

Apr. 26, 2002 (KR) ............... 10-2002-0023133

(51) Int. Cl.
*H04L 12/26* (2006.01)
*H04L 1/18* (2006.01)

(52) U.S. Cl. ............... 370/235; 370/236; 370/449; 714/748; 714/750

(58) Field of Classification Search ............ 370/236, 370/235, 346, 449; 714/748, 749, 750, 751
See application file for complete search history.

(56) References Cited

U.S. PATENT DOCUMENTS

| | | | | |
|---|---|---|---|---|
| 4,970,714 | A * | 11/1990 | Chen et al. ............ | 370/216 |
| 5,467,341 | A * | 11/1995 | Matsukane et al. ..... | 370/253 |
| 5,487,072 | A * | 1/1996 | Kant .................... | 714/748 |
| 5,566,351 | A * | 10/1996 | Crittenden et al. ..... | 710/46 |
| 6,035,196 | A * | 3/2000 | Hengeveld et al. ..... | 455/437 |
| 6,317,224 | B1 * | 11/2001 | Lutgen et al. ......... | 358/412 |
| 6,643,813 | B1 * | 11/2003 | Johansson et al. ..... | 714/748 |
| 6,697,331 | B1 * | 2/2004 | Riihinen et al. ....... | 370/236 |
| 6,871,078 | B2 * | 3/2005 | Nishioka et al. ....... | 455/522 |
| 6,888,816 | B2 * | 5/2005 | Jiang .................. | 370/346 |
| 6,907,005 | B1 * | 6/2005 | Dahlman et al. ....... | 370/236 |
| 6,947,394 | B1 * | 9/2005 | Johansson et al. ..... | 370/282 |
| 6,993,358 | B2 * | 1/2006 | Shiotsu et al. ........ | 455/552.1 |
| 7,006,798 | B2 * | 2/2006 | Miyoshi et al. ........ | 455/67.11 |

(Continued)

FOREIGN PATENT DOCUMENTS

WO WO 00/62468 10/2000

OTHER PUBLICATIONS

Chinese Office Action dated Apr. 15, 2005.

*Primary Examiner*—Duc M Nguyen
(74) *Attorney, Agent, or Firm*—Ked & Associates, LLP

(57) ABSTRACT

A method for polling a protocol data unit (PDU) of a Radio link control (RLC), including the steps of selecting a data unit in a buffer, transmitting a selected PDU and polling bit to a receiver when it is a polling period, receiving a status signal from the receiver corresponding to the polling bit and varying the polling period when the status signal is received more than a predetermined number of times spanning a number of transmission time period, can prevent waste of wireless resources and delay of data transmission by adaptively varying the radio access capability of a terminal according to the status of the wireless environment. The status signal is an Acknowledge (ACK) signal or a Negative acknowledge (NACK) signal, and if the ACK signal is received more than a predetermined number of times, the polling period is increased and if the NACK signal is received more than a predetermined number of times, the polling period is decreased.

26 Claims, 5 Drawing Sheets

U.S. PATENT DOCUMENTS

2002/0046379 A1* 4/2002 Miki et al. .................. 714/749
2002/0059464 A1* 5/2002 Hata et al. .................. 709/247
2002/0131372 A1* 9/2002 Rinchiuso .................. 370/252
2003/0063587 A1* 4/2003 Cho et al. .................. 370/335

* cited by examiner

_METHOD AND SYSTEM FOR POLLING PDU OF RADIO LINK CONTROL LAYER_

BACKGROUND OF THE INVENTION

1. Field of the Invention

The present invention relates to communications systems, and more particularly to a method for controlling the transmission of polling a protocol data unit (PDU) in a wireless communications system.

2. Background of the Related Art

A universal mobile telecommunications system (UMTS) is a third generation mobile communication system that has evolved from a standard known as Global System for Mobile communications (GSM). This standard is a European standard which aims to provide an improved mobile communication service based on a GSM core network and wideband code division multiple access (W-CDMA) technology. In December, 1998, the ETSI of Europe, the ARIB/TTC of Japan, the T1 of the United States, and the TTA of Korea formed a Third Generation Partnership Project (3GPP) for the purpose of creating the specification for standardizing the UMTS.

The work towards standardizing the UMTS performed by the 3GPP has resulted in the formation of five technical specification groups (TSG), each of which is directed to forming network elements having independent operations. More specifically, each TSG develops, approves, and manages a standard specification in a related region. Among them, a radio access network (RAN) group (TSG-RAN) develops a specification for the function, data desired, and interface of a UMTS terrestrial radio access network (UTRAN), which is a new RAN for supporting a W-CDMA access technology in the UMTS.

The TSG-RAN group includes a plenary group and four working groups. Working group 1 (WG1) develops a specification for a physical layer (a first layer). Working group 2 (WG2) specifies the functions of a data link layer (a second layer) and a network layer (a third layer). Working group 3 (WG3) defines a specification for an interface among a base station in the UTRAN, a radio network controller (RNC), and a core network. And, Working group 4 (WG4) discusses requirements desired for a radio link performance and data desired for radio resource management.

FIG. 1 shows the structure of a radio access interface protocol used between a terminal operating based on a 3GPP RAN specification and a UTRAN.

When viewed horizontally, the radio access interface protocol includes a physical layer (PHY), a data link layer, and a network layer; and when viewed vertically the protocol is divided into a control plane (C-plane) for transmitting a control signal and a user plane for transmitting data information. The user plane is a region to which traffic information of a user such as voice or an IP packet is transmitted. The control plane is a region to which control information such as an interface of a network or maintenance and management of a call is transmitted.

Also, the protocol layers may be divided into a first layer (L1), a second layer (L2), and a third layer (L3) based on three lower layers of an open system interconnection (OSI) standard model well known in a communication system.

The first layer (L1) operates as a physical layer (PHY) for a radio interface and, according to related technology, is connected to an upper medium access control (MAC) layer through one or more transport channels. The physical layer transmits data delivered to the physical layer (PHY) through a transport channel to a receiver using various suitable coding and modulating methods.

The second layer (L2) operates as a data link layer and lets various terminals share the radio resources of a W-CDMA network. The second layer (L2) is divided into the MAC layer, a radio link control (RLC) layer, a packet data convergence protocol (PDCP) layer, and a broadcast/multicast control (BMC) layer.

Among them, the RLC layer forms an appropriate protocol data unit (PDU) suitable for transmission by the segmentation and concatenation functions of a service data unit (SDU) received from an upper layer. The RLC layer also performs an automatic repeat request (ARQ) function by which a PDU lost during transmission is re-transmitted. The RLC layer operates in three modes, a transparent mode (TM), an unacknowledged mode (UM), and an acknowledged mode (AM). The mode selected depends upon the method used to process the RLC SDU received from the upper layer. Also, an RLC buffet stores the received SDUs or the RLC buffers for storing the PDUs received from the upper layer exists in the RLC layer.

In addition, the packet data convergence protocol (PDCP) layer is an upper layer of the RLC layer which allows data items to be transmitted through a network protocol such as the IP.v4 or the IP.v6. A header compression technique for compressing and transmitting the header information in a packet can be used for effective transmission of the IP packet.

The RLC layer will now be described in more detail.

As previously indicated, the RLC layer operates in three modes: TM, UM, and AM. The AM mode will now be described.

One of the most significant characteristics of AM mode operation is its ability to support the re-transmission of a PDU when the PDU is not successfully transmitted or received. More specifically, when the transmitter RLC layer transmits a PDU, the receiver determines whether each PDU is received and then generates status information indicating the result. The receiver then sends the status information back to inform the transmitter as to whether the PDU was received. When the transmitter receives the status information from the receiver indicating that the PDU was not received, the PDU is re-transmitted to the receiver.

A process for transmitting the PDU in the transmitting RLC will be described with reference to FIG. 2. FIG. 2 shows a structure of a RLC transmitter 100 which transmits PDUs to a receiver.

As shown, when a PDU generator 101 receives an SDU from an upper layer, the PDU generator segments or concatenates the SDU in order to make the SDU a uniform size of a PDU. A PDU may be generated by adding an RLC header to each segment, and a sequence number may be included in the header. The PDU may be classified based on its sequence number.

PDUs generated in this way are stored in both a transmission buffer 102 and a re-transmission buffer 104. The RLC transmitter sends the PDUs stored in transmission buffer 102 to a lower layer based on a number requested by the lower layer every transmission time interval (TTI). At this time, a polling bit setting unit 104 determines whether to set a polling bit requesting the receiver to send status information for a specific PDU among the transmitted PDUs. The PDU in which the polling bit is to be set varies according to a polling trigger.

Thereafter, the PDUs sent to the lower layer are transmitted to the receiver through a radio interface. In the receiver, a RLC forms SDUs using information in the headers of the PDUs, and SDUs are then delivered to the receiver upper layer.

When the polling bit is set in one PDU among the received PDUs, the receiver RLC checks whether the PDUs are correctly received and transmits status information to the transmitter RLC. Then, the transmitter RLC deletes successfully transmitted PDUs from re-transmission buffer 102. PDUs that are not successfully transmitted, as determined by negative status information, are sent to the transmission buffer and are re-transmitted.

At this time, only PDUs which receive a negative acknowledgment are re-transmitted. The re-transmitted PDUs are left in the re-transmission buffer until the transmission is determined to be successful. Re-transmitted PDUs may be given priority over first-transmitted PDUs, and it is possible to set a polling bit in the re-transmitted PDU.

In the RLCs of transmitting and receiving sides, a transmission window and reception window are respectively used to transmit and receive PDUs. In general, the size of the transmission window is the same as the size of the reception window. The transmission window has a size which corresponds to a predetermined maximum number of PDUs that can be transmitted. PDUs within the range of the window are transmitted from a transmission buffer, subsequent PDUs are loaded into the buffer. The reception window in the receiver receives only PDUs that lie within a valid range. More specifically, the receiver receives only PDUs having transmission sequence numbers that lie within the limits of the reception window. PDUs received beyond the range of the reception window are discarded as soon as the PDUs are received.

Generally, a polling means that the transmitter requests status information from the receiver. When the receiver receives a polling request from the transmitter, the receiver must check the reception state of PDUs received up to that point. The receiver then sends information concerning this reception state to the transmitter.

Therefore, for polling, the transmitter sets a polling bit in a PDU before transmission. When the PDU containing the polling bit is received, the receiver checks the state of a reception buffer with respect to this and previously received PDUs, and then informs the transmitter of information concerning whether each PDU up to that point was successfully received.

Because transmitting status information wastes radio resources, transmission of status information must be controlled by an appropriate method. That is, the transmitter must set the polling bit only for a PDU which satisfies a certain rule, without requesting the status information in every PDU. Such a rule is known as a polling trigger.

As described above, conventionally, the polling bit is set in the transmitted PDU using a fixed polling trigger. Therefore, in spite of the situation where the status information is not necessarily required by the receiver, that is, a situation where the PDUs can be transmitted without polling in the wireless environment, the transmitting RLC requires polling by the receiver according to the fixed polling trigger, causing a waste of radio resources and data transmission delay.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Therefore, an object of the present invention is to provide a method for polling a PDU of a RLC layer, capable of preventing a waste of radio resource and data transmission delay by varying a polling period according to a status of a wireless environment.

Another object of the present invention is to provide a method for polling a PDU of a RLC layer, capable of varying a polling period on the basis of a status signal.

To achieve these and other advantages, there is provided a method for polling a PDU of a RLC layer, including the steps of selecting a data unit in a buffer, transmitting a selected PDU and polling bit to a receiver when it is a polling period, receiving a status signal from the receiver corresponding to the polling bit and varying the polling period when the status signal is received more than a predetermined number of times spanning a number of transmission time period.

It is desirable that the buffer is a transmission buffer, and the varying process can be performed in a radio link control (RLC) protocol layer of at least one of a transmitter and a network apparatus.

It is desirable that the status signal is an acknowledge (ACK) signal and the polling period increases when the ACK signal is received more than a predetermined number of times. A maximum value of the polling period is identical to the size of the transmission window.

It is desirable that the status signal is a negative acknowledge (NACK) signal, and the polling period decreases when the NACK signal is received more than a predetermined number of times. The predetermined times can be continuous or discontinuous.

The method for polling the PDU of the RLC layer, can further include the steps of determining whether the varied polling period exceeds the size of the transmission window and setting the polling bit in the last data unit in the transmission window in case the varied polling period exceeds the size of the transmission window.

The foregoing and other objects, features, aspects and advantages of the present invention will become more apparent from the following detailed description of the present invention when taken in conjunction with the accompanying drawings.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

The accompanying drawings, which are included to provide a further understanding of the invention and are incorporated in and constitute a part of this specification, illustrate embodiments of the invention and together with the description serve to explain the principles of the invention.

IN THE DRAWINGS

Figure 1:
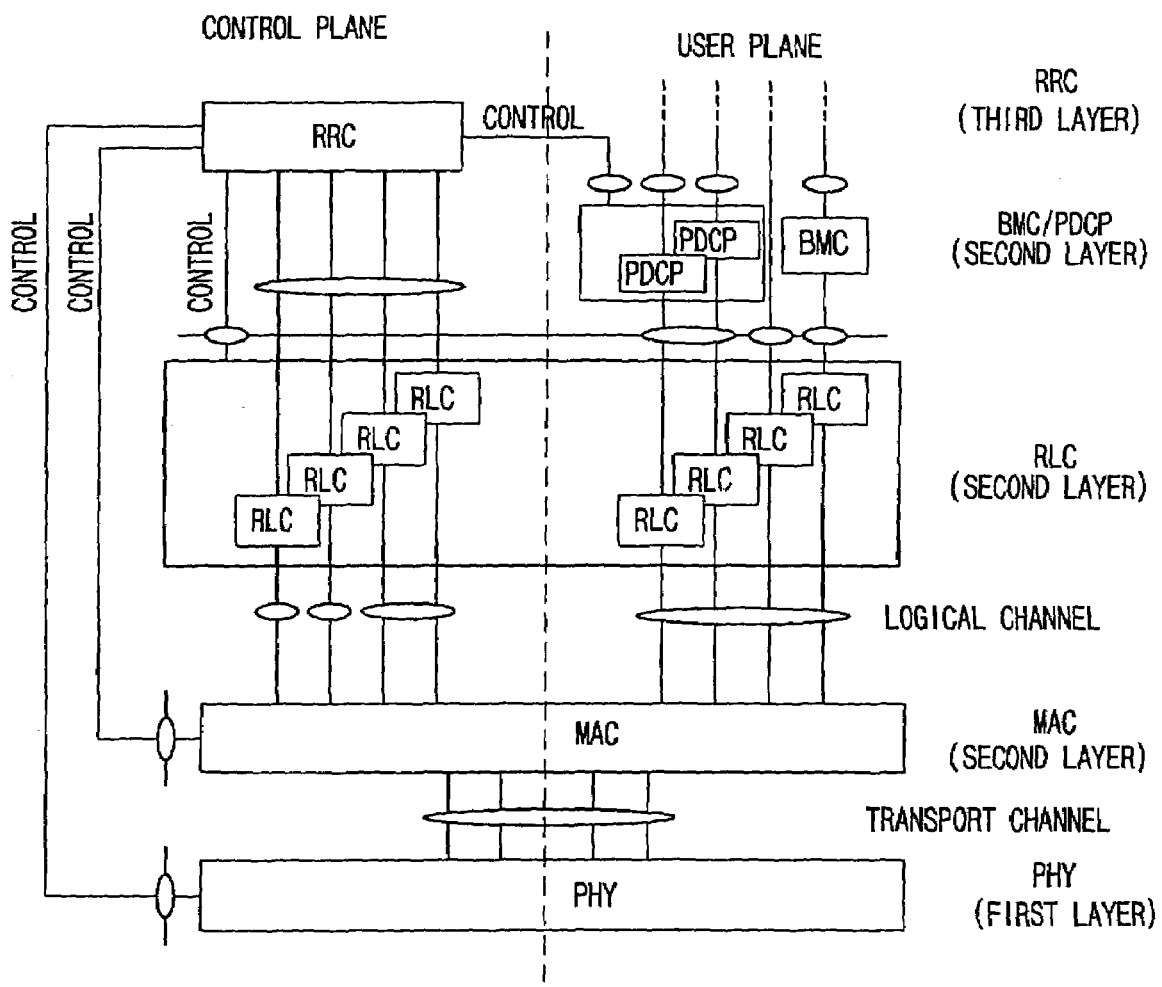
Figure 2:
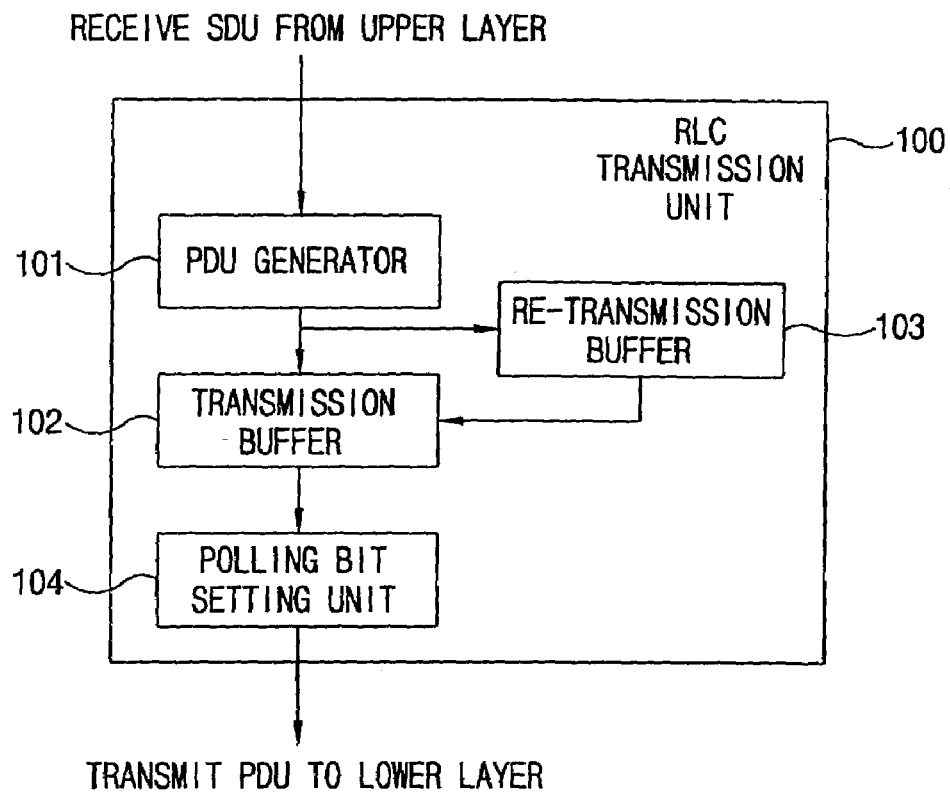
Figure 3:
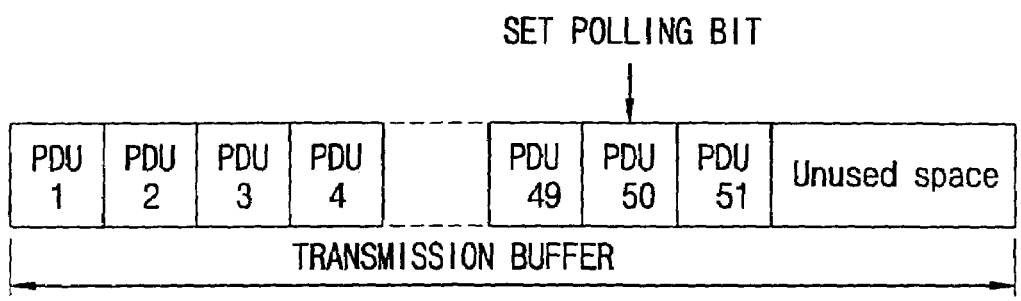
Figure 4:
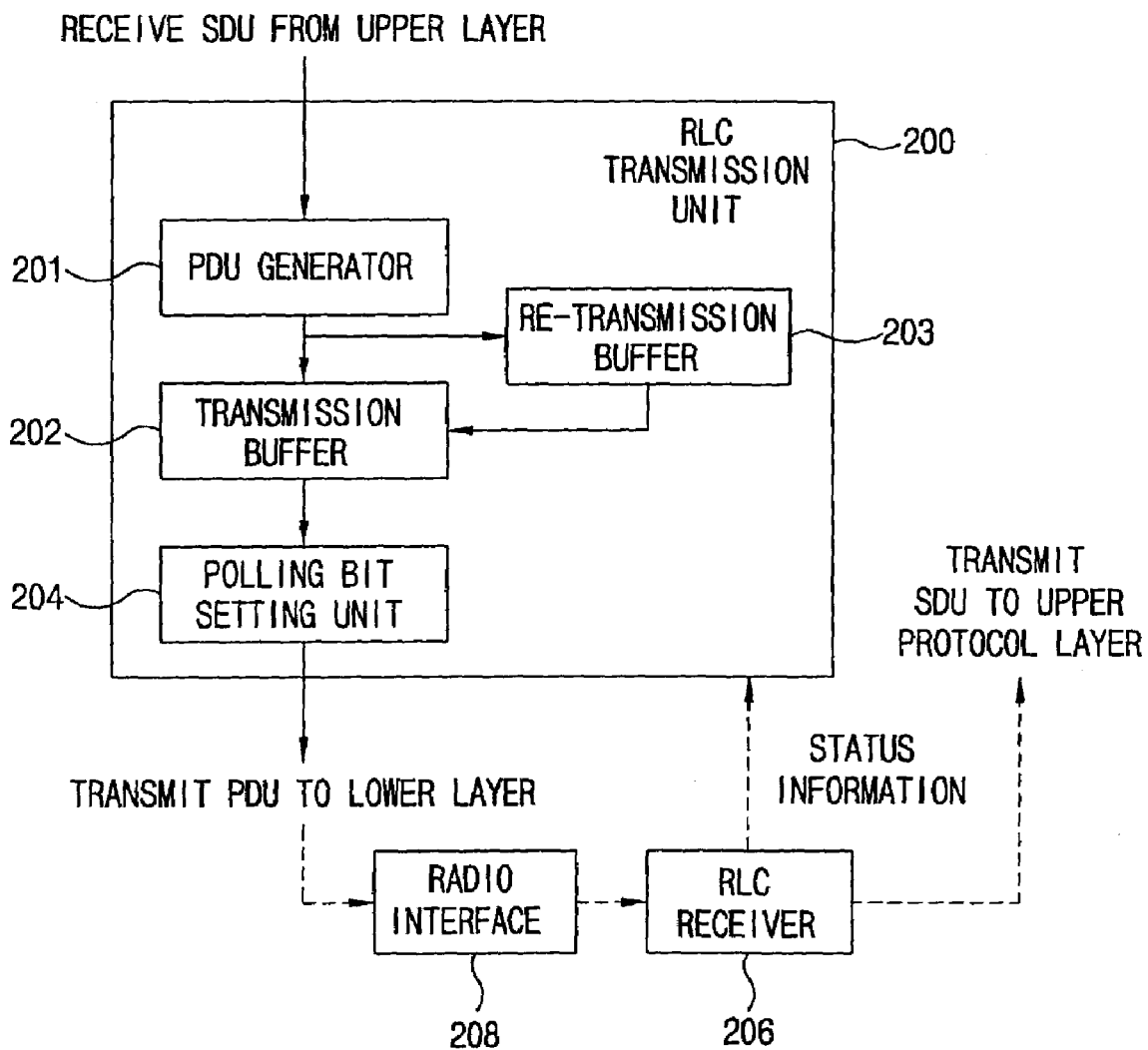
Figure 5:
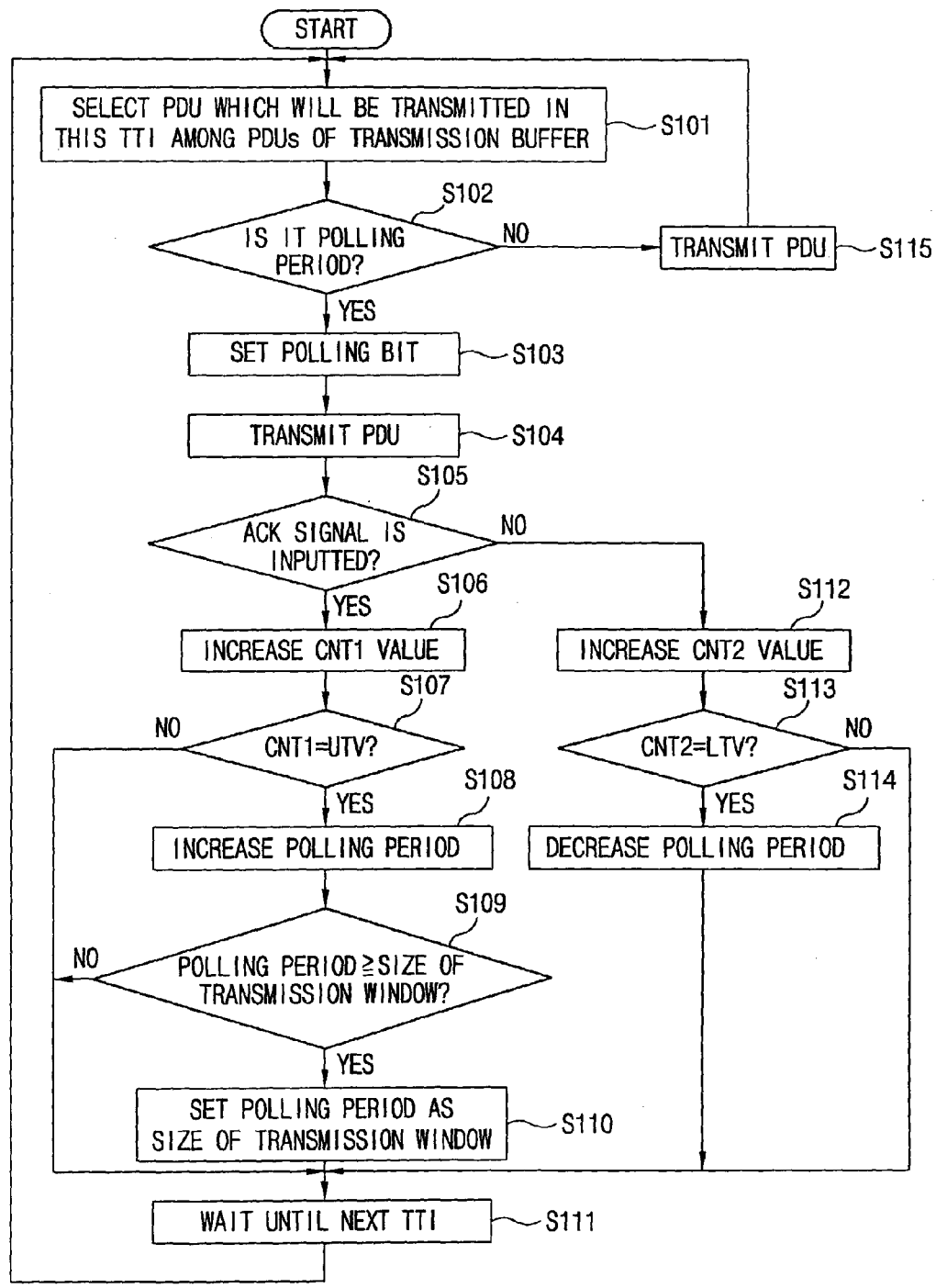
Figure 6:
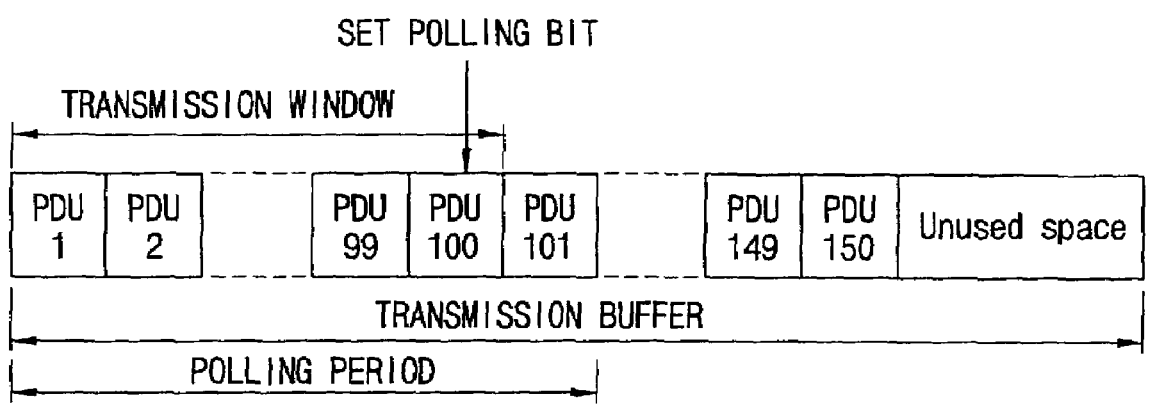

FIG. 1 is a diagram showing the structure of a radio interface protocol used between a terminal operating based on a 3GPP RAN specification and a UTRAN;

FIG. 2 is a diagram showing a structure of a radio link control layer of a transmitter operating in acknowledged mode;

FIG. 3 is a diagram showing an example of polling trigger which is based on a predetermined PDU in a transmission buffer;

FIG. 4 is a diagram showing a RLC transmitter in accordance with one embodiment of the present invention which is operated in the AM mode;

FIG. 5 is a diagram showing a PDU polling method of the RLC layer in accordance with one embodiment of the present invention; and FIG. 6 is a diagram showing the setting of a polling bit when the PDU polling period exceeds a size of a transmission window according to one embodiment of the invention.

DETAILED DESCRIPTION OF PREFERRED EMBODIMENTS

Reference will now be made in detail to preferred embodiments of the present invention, examples of which are illustrated in the accompanying drawings.

The invention is preferably implemented in a mobile communications system such as the Universal Mobile Telecommunications System (UMTS) currently being developed by the third-generation partnership project (3GPP). The invention can be adapted for communications systems that operate by other standards. A detailed discussion of embodiments of the invention will now be provided.

The invention is ideally suited for use in a specific layer of a communications protocol which is adapted for operation within a UMTS Terrestrial Radio Access Network (UTRAN). The layer may be a data link layer of the protocol, and when implemented in this manner may correspond to at least the radio link control RLC) layer. Lower layers of this protocol are generally shown in FIG. 1, a detailed discussion of which has been previously provided.

Preferably, the invention is applied within an RLC layer operating in the acknowledged mode (AM). Those skilled in the art can appreciate, however, that the invention may also be applied in other contexts. For example, the radio link protocol (RLP) layer of a radio communication system in accordance with the present invention may be adapted to operate according to a CDMA 2000 standard.

FIG. 4 is a diagram showing a transmitter 200 in accordance with one embodiment of the present invention which transmits protocol data units using an RLC layer preferably operating in AM mode.

As shown in the drawing, the transmitter 200 includes a PDU generator 201, a transmission buffer 202, a re-transmission buffer 203, and a polling bit setting unit 204.

The transmitter 200 may be included in any one of a variety of forms of user equipment, including but not limited to a mobile telephone, a personal digital assistant, a pocket PC, a laptop or notebook computer, or any other device which receives signals wirelessly transmitted over a mobile communications network.

The PDU generator 201 receives data units (e.g., SDUs) from an upper protocol layer and then segments or concatenates these SDUs in order to form PDUs of a uniform size. The PDUs may be formed by adding an RLC header to each segment. A sequence number is preferably included in the header for the purpose of classifying or otherwise identifying the PDU. The sequence number may be a transmission sequence number for allowing a RLC receiver (206) perform in-sequence processing of PDUs sent from the RLC transmitter 200.

The transmission buffer 202 stores the PDUs output from generator 201. These PDUs are sequentially delivered to a lower protocol layer based on a sequence number requested by the lower layer every transmission time interval (TTI). The lower layer then transmits the PDUs to a receiver through a radio interface 208. In the RLC receiver 206, a RLC layer forms SDUs from the received PDUs based on information in the PDU headers. The resulting SDUs are then delivered to an upper protocol layer by the RLC receiver using the information included in a PDU header.

The re-transmission buffer 203 also stores the PDUs output from generator 201. Unlike the transmission buffer, however, the purpose of the re-transmission buffer is to enable a transmitted PDU to be re-transmitted in the event it was not successfully received by the receiver.

The re-transmission buffer 203 operates in accordance with status information from the receiver. More specifically, when polling information is set in a received PDU, the RLC receiver checks whether this and preceding PDUs have been correctly received. Then, the receiver transmits status information to the transmitter indicating the PDUs which were successfully received.

The RLC transmitter deletes PDUs from the re-transmission buffer 203 indicated to have been successfully received according to the status information. PDUs that were not successfully received are outputted from the re-transmission buffer 203 and re-transmitted. A negative acknowledgment (NACK) signal may be included in the status information for indicating that a PDU was not successfully received. Re-transmitted PDUs may be left in the re-transmission buffer until the transmission is successful, or alternatively until the PDU has been re-transmitted a predetermined number of times. When either of these events occurs, the PDU may be deleted from the re-transmission buffer 203. Re-transmitted PDUs may be given priority over first-transmitted PDUs if desired.

Polling bit setting unit 204 determines whether to send polling information with a protocol data unit output from the transmission buffer. The polling bit setting unit performs this function based on whether the protocol data unit is a last data unit in a transmission buffer, a last data unit in a transmission window, or both. As previously discussed, if polling information is included in a PDU, upon detection the RLC receiver will send back status information to the RLC transmitter indicating whether this and preceding PDUs were successfully received. The polling information may be in the form of one or more bits set in a dedicated field of a PDU header. If desired, polling information may be included in re-transmitted PDUs.

The polling period is controlled by the status information sent by the RLC receiver back to the RLC transmitter. That is, the polling period varies on the basis of the status information indicating that the PDUs were successfully received.

FIG. 5 shows steps included in one embodiment of the method of the present invention.

The method is preferably implemented by the RLC transmitter such as shown in FIG. 4, and according to at least one aspect addresses the manner in which polling information is assigned to PDUs output from the transmission and re-transmission buffers. More specifically, the present invention advantageously controls the polling bit together with the PDUs according to the polling period.

An initial step of the method includes selecting a protocol data unit from a plurality of PDUs stored in the transmission buffer 202 (S101). As previously described, this transmission buffer 202 may be loaded based on PDUs outputted from the generator 201. These PDUs are preferably stored in order of a predetermined transmission sequence and consequently may have consecutive transmission sequence numbers. Selection of data units is preferably performed within corresponding transmission time intervals (TTI).

When PDUs which will be transmitted are selected, whether it is currently the polling period is determined (S102). The determination is performed by checking whether the selected PDUs ate identical to the polling period which was initially set. For instance, in case the initial polling period is set as 50, when the PDU corresponding to the $50^{th}$ position is in the transmission buffer 202, the polling bit setting unit 204, as shown in FIG. 4, sets the polling bit in the $50^{th}$ PDU, and transmits the polling bit to the lower protocol layer of the RLC transmitter (S103 and S104). Therefore, the PDUs can be transmitted to the RLC receiver together with the polling bit (S104), and the polling bit is stored in a dedicated field of the PDU header.

If it is not the polling period yet, the RLC transmitter transmits the PDU without the polling bit to a lower protocol layer (S115). The above process is continuously performed by selecting the next sequential PDU in the range of the transmission window.

When the RLC of the receiver receives the polling bit, the corresponding status information (Acknowledge: ACID or negative Acknowledge: NACK) is transmitted to the RLC transmitter. The status information indicates whether the PDU which was transmitted together with the polling bit was successfully received by the RLC receiver, and indicates whether the preceding PDUs of the corresponding PDU are successfully received together with the polling bit.

The polling period is changed on the basis of the status information (ACK or NACK signal) transmitted from the RLC receiver to prevent waste of the wireless resource and data transmission delay by varying the polling period according to the status of the wireless environment.

The polling bit setting unit 204 checks whether the status information indicating that the PDU was successfully received from the RLC receiver, that is, checks whether the ACK signal is received (S105). If the ACK signal is inputted, a count value (CNT1) indicating an input number of the ACK signal is increased. The polling bit setting unit 204 checks whether the count value (CNT1) is higher than a predetermined number of times, that is, whether the count value is identical to an upper threshold value (UTV) (S107). At this time, the count value is a discrete count value, and a continuous count value can be used to understand the status of the wireless environment more precisely, if required. In accordance with one embodiment, the term discrete corresponds to the case where the varied width of the polling period is small. and the term continuous corresponds to the case where the polling period varies at a regular width.

The UTV is a standard indicating that the status of the wireless environment is good, that is, the count value is identical to the UTV. This means that the PDU can be transmitted without polling in the wireless environment. If the count value (CNT1) and UTV are not identical, the above processes (S101-S107) are repeatedly performed after waiting until the next TTI (S111), and if the CNT1 is identical to the UTV, the polling period which was initially set is increased (S108).

The polling bit setting unit 204 repeatedly performs the above process increasing the polling period, and when the polling period becomes larger than or the same as the size of the transmission window, the polling period is set as the size of the window (S109 and S110). In this case, as shown in FIG. 6, the polling bit is set in the last PDU of the transmission window, that is, $100^{th}$ PDU.

Therefore, the RLC transmitter reduces the number of times of polling which is requested with the RLC receiver by the increased polling period, thus to prevent waste of wireless resources and delay of data transmission.

On the other hand, if the ACK signal is not received from the RLC receiver in the process (S105), PDUs which were not successfully received (missing PDUs) are outputted in the re-transmission buffer and re-transmitted and the re-transmission PDUs are transmitted with the polling bit and may be given priority in the transmission window.

The polling bit setting unit 204 increases the count value (CNT2) indicating the number of times that the NACK signals are inputted (S112) and checks whether the corresponding count value (CNT2) is larger than a predetermined number of times, that is, whether the count value is identical to a Lower Threshold Value (LTV) (S113). The LTV is a standard which indicates that the status of the wireless environment is not good. If the count value (CNT2) is identical to the LTV, it means that the current wireless environment is not good and polling is often required. Accordingly, the PDUs must be transmitted together with the polling bit.

If the count value (CNT2) is not identical to the LTV, the above processes (S101-S105, S112 and S113) are repeatedly performed after waiting until the next TTI (S111), and if the CNT2 is identical to the LTV, the formerly set polling period is reduced (S114).

Therefore, the RLC transmitter increases the number of times of polling that is requested by the RLC receiver by the decreased polling period. Thus, increasing the reliability of data transmission.

As described above, the polling method in accordance with the present invention adjusts the polling period according to the status signal. The polling period can correspond to the maximum size of a predetermined window, and the polling period can be limited to be smaller than the maximum size, if required.

As described above, the polling method in accordance with the embodiment of the present invention adaptively varies the radio access capability of a terminal according to the status of the wireless environment, to prevent a waste of wireless resources and delay of data transmission and improve the reliability.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for polling a protocol data unit (PDU), comprising:
   selecting a protocol data unit;
   transmitting the selected PDU and a polling bit when a polling period is reached;
   receiving a status signal in response to the polling bit; and
   varying the polling period in accordance with the received status signal, wherein said varying includes:
   counting a number of previously received status signals of a first type;
   counting a number of previously received status signals of a second type;
   determining whether the status signal received in response to the polling bit corresponds to said first type or said second type;
   if the status signal received in response to the polling bit is said first type, then:
   (a) incrementing a first count value corresponding to the number of previously received status signals of said first type,
   (b) comparing the incremented first count value to a first threshold value indicative of a first wireless environment condition, and
   (c) varying the polling period based on a result of the comparison in (b); and if the status signal received in response to the polling bit is said second type, then:
   (d) incrementing a second count value corresponding to the number of previously received status signals of said second type,
   (e) comparing the incremented second count value to a second threshold value indicative of a second wireless environment condition, and
   (f) varying the polling period based on a result of the comparison in (e).

2. The method of claim 1, wherein the data unit is selected from a buffer, the polling bit is transmitted to a receiver, and the status signal is received from the receiver.

3. The method of claim 2, wherein the polling period is set between transmission of a previously selected PDU with a polling bit and transmission of the selected PDU with the polling bit, and wherein expiration of the polling period activates transmission of the polling bit with the selected PDU.

4. The method of claim 2, wherein the status signal of said first type is an acknowledge (ACK) signal and the status signal of said second type is a non-acknowledgment (NACK) signal.

5. The method of claim 2, wherein the polling period increases when the incremented first count value is greater than the first threshold value.

6. The method of claim 5, wherein the polling period decreases when the incremented second count value is greater than the second threshold value.

7. The method of claim 1, wherein a maximum value of the polling period is identical to a size of a transmission window.

8. The method of claim 1, further comprising:
   transmitting another selected data unit without a polling bit when the polling period has not yet expired.

9. The method of claim 1, wherein varying the polling period is performed in a radio link control (RLC) protocol layer of at least one of a transmitter and a network apparatus.

10. A method for polling a protocol data unit (PDU) in a system in which data is transmitted from a transmitter to a receiver and the transmitter polls the receiver to receive status information from the receiver, comprising:
    sequentially selecting PDUs from a transmission buffer;
    transmitting a polling bit to the receiver by setting the polling bit in one of the selected PDUs for each polling period;
    receiving a status signal from the receiver; and
    varying the polling period based on the status signal, wherein said varying includes if the status signal received in response to the polling bit is a first type, then:
    (a) incrementing a first count value corresponding to a number of previously received status signals of said first type,
    (b) comparing the incremented first count value to a first threshold value indicative of a first wireless environment condition, and
    (c) varying the polling period based on a result of the comparison in (b); and if the status signal received in response to the polling bit is a second type, then:
    (d) incrementing a second count value corresponding to the number of previously received status signals of said second type,
    (e) comparing the incremented second count value to a second threshold value indicative of a second wireless environment condition, and
    (f) varying the polling period based on a result of the comparison in (e).

11. The method of claim 10, wherein the status signal of said first type is an acknowledge (ACK) signal and the polling period increases when the ACK signal is received more than said first threshold value.

12. The method of claim 11, wherein the status signal of said second type is a negative acknowledge (NACK) signal, and the polling period decreases when the NACK signal is received more than said second threshold value.

13. The method of claim 10, wherein a maximum value of the polling period is identical to a size of a transmission window.

14. The method of claim 13, wherein the polling bit is set in a last PDU of the transmission window when the polling period is identical to the size of the transmission window.

15. The method of claim 10, wherein the polling period is set between transmission of a previously selected PDU set with a polling bit and transmission of the selected PDU set with the polling bit, and wherein expiration of the polling period activates transmission of the selected PDU set with the polling bit.

16. The method of claim 15, wherein the RLC layer is positioned in a mobile terminal of a mobile communications system.

17. The method of claim 15, wherein the RLC layer is positioned in a network apparatus.

18. The method of claim 10, wherein the status signal is received and counted and the polling period is varied for each PDU continuously selected in each transmission time period.

19. A transmitter for polling a protocol data unit, comprising:
    a receiver that receives a signal;
    a polling bit setter that sets a polling bit in a protocol data unit based on the signal; and
    a transmitter circuit that transmits the protocol data unit, wherein said polling bit setter includes:
    a first counter to count received status signals of a first type; and
    a second counter to count received status signals of a second type;
    wherein if a status signal received in response to the polling bit is said first type, the polling bit setter increments the first counter, compares a value of the incremented first counter to a first threshold value indicative of a first wireless environment condition, and varies a polling period of the transmitter based on a result of the comparison to said first threshold value; and wherein if the status signal received in response to the polling bit is said second type, the polling bit setter increments the second counter, compares a value of the incremented second counter to a second threshold value indicative of a second wireless environment condition, and varies the polling period of the transmitter based on a result of the comparison to said second threshold value.

20. The transmitter of claim 19, further comprising a protocol data unit generator.

21. The transmitter of claim 19, further comprising a buffer.

22. The transmitter of claim 19, further comprising a transmission buffer.

23. The transmitter of claim 19, further comprising a re-transmission buffer.

24. The transmitter of claim 19, further comprising a transmission buffer and a re-transmission buffer.

25. A method for polling in a communication system, comprising:

setting a polling bit in one of a plurality of protocol data units (PDUs);

transmitting the PDU containing the polling bit to a receiver;

receiving a status signal from the receiver in response to the polling bit; and varying a polling period for controlling transmission of a next PDU set with a polling bit based on the status signal, wherein varying the polling period includes:

counting a number of previously received status signals of a first type;

counting a number of previously received status signals of a second type;

determining whether the status signal received in response to the polling bit corresponds to said first type or said second type;

if the status signal received in response to the polling bit is said first type, then:
  (a) incrementing a first count value corresponding to the number of previously received status signals of said first type,
  (b) comparing the incremented first count value to a first threshold value indicative of a first wireless environment condition, and
  (c) varying the polling period based on a result of the comparison in (b); and if the status signal received in response to the polling bit is said second type, then:
  (d) incrementing a second count value corresponding to the number of previously received status signals of said second type,
  (e) comparing the incremented second count value to a second threshold value indicative of a second wireless environment condition, and
  (f) varying the polling period based on a result of the comparison in (e).

26. The method of claim 25, wherein the polling period is set between transmission of a previous PDU containing a polling bit and transmission of the PDU containing the polling bit, and wherein expiration of the polling period activates transmission of the PDU containing with the polling bit.

* * * * *